Jan. 21, 1958     L. E. WILLE     2,820,316
FISHING LURE
Filed July 24, 1956
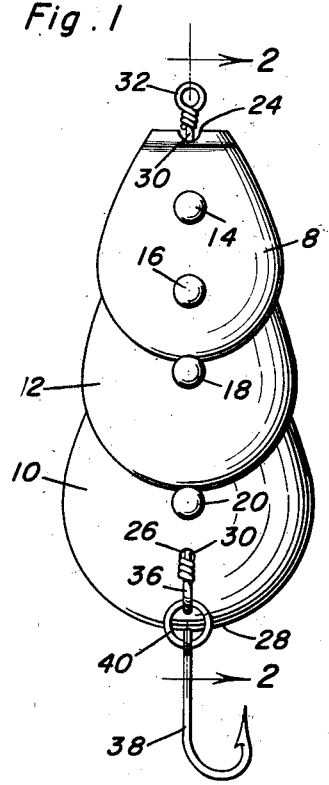
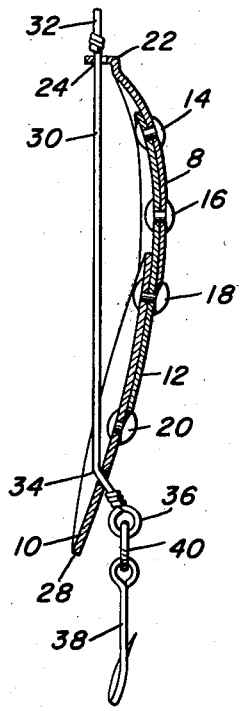
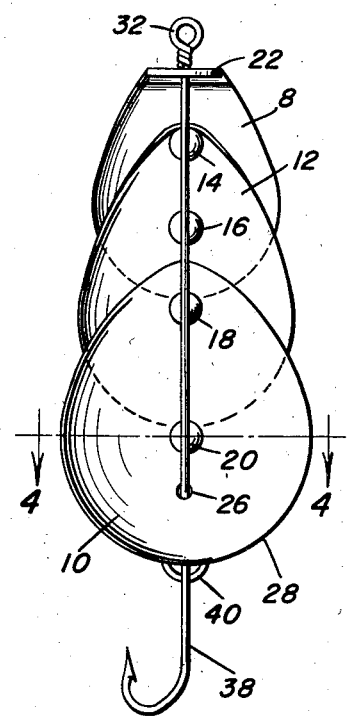
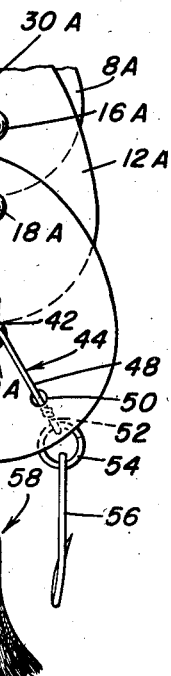
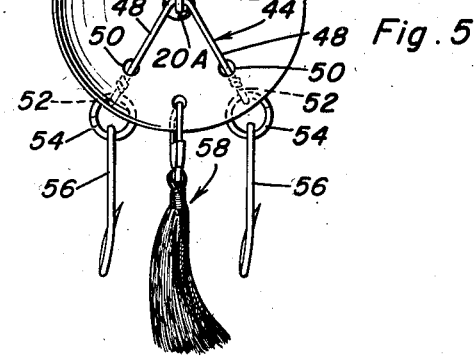
Louis E. Wille
INVENTOR.

United States Patent Office 2,820,316
Patented Jan. 21, 1958

2,820,316

FISHING LURE

Louis E. Wille, Laramie, Wyo.

Application July 24, 1956, Serial No. 599,786

1 Claim. (Cl. 43—42.36)

This invention relates to a novel spoon-type lure which is constructed and designed to be pulled through the water which is being fished and which, because of its ability to be readily seen and heard, attracts and catches game fish. Briefly, this improved lure is characterized by a plurality of concavo-convex spoons rigidly secured end-to-end in general lengthwise alignment and providing a body, said body having holes therein at its leading and trailing ends, respectively, wire means extending longitudinally and underlying the normal bottom side of said body and having portions passing through and beyond the respective holes, said wire means having an eye at the forward end to which the usual fishing line is attached, and at least one eye at its rearward end to which a fishhook is attached.

More specifically, one spoon is superimposed in part upon and affixed to the next adjacent spoon, the concave sides of said spoons facing upwardly when in use, said holes being of a diameter greater than the cross-section of the portions of the wire means passing therethrough, whereby the wire means acts as a shaft and the multiple-spoon-body rocks from side to side on said shaft.

In carrying out the invention the body is made up of three companion spoons; namely, a leading spoon, a trailing spoon and a central spoon interposed between said leading and trailing spoons, said spoons increasing in size from the forward end toward the rearward end of said body, whereby the leading spoon is the smallest, the central spoon slightly larger than the leading spoon, and the trailing spoon is the largest.

Other objects, features and advantages will become more readily apparent from the following detailed description and the accompanying claim.

In the drawings:

Fig. 1 is a bottom plan view of the improved fishing lure;

Fig. 2 is a section on the line 2—2 of Fig. 1;

Fig. 3 is a top plan view of the same;

Fig. 4 is a cross-section on the line 4—4 of Fig. 3; and,

Fig. 5 is a fragmentary top plan view disclosing a modification of the truss-like wire means.

Fish experts contend and agree that any unusual object in motion, a lure for example, especially one which produces agitated commotion in the water and attending sound, serves to arouse, attract and cause the fish to strike. The herein disclosed lure is, therefore, constructed to function accordingly.

In the drawings and with reference first to Figs. 1 to 4, inclusive, it will be seen that the stated body comprises several spoons; namely, a leading spoon 8, a trailing spoon 10 and a central spoon 12 interposed between and secured to spoons 8 and 10. All of the spoons are concavo-convex and generally ovoid in plan. It will be noticed in this connection that the spoons increase in size from the forward toward the rearward end of the body whereby the leading spoon is smallest, the central spoon slightly larger than the leading spoon, and the trailing spoon the largest. The smaller end of the central spoon 12 underlies the larger rear end of the leading spoon 8 so that the latter is superimposed upon and overlaps the spoon 12 and is secured thereto by two rivets or equivalent fasteners 14 and 16. The central spoon 12 similarly overlies or is superimposed on the smaller end portion of the rear spoon 10 and is secured by way a centrally disposed rivet 18. It will be noticed in this connection and as seen in Fig. 2, that an edge portion of the head of the rivet overlaps and holds down the coacting rear edge portion of the spoon 8. The larger trailing spoon 10 is provided centrally with a rivet 20 and its primary purpose as seen in Fig. 2 is to overlap the rear edge portion of the central spoon 12. Therefore, these three spoons are clustered into a group providing a multiple-spoon-body with the rivets all centralized and in line with each other. The over-all body is sometimes referred to as a lure having an armor-like appearance. The spoon 8 is preferably of polished nickel, the spoon 12 of polished brass and the spoon 10 of polished copper. It follows that the finished product has a shiny appearance and the light rays reflected from movement of the spoons in the water provide the desired flash attraction feature. The smaller leading end of the spoon 8 has a flange 22 with a hole 24 therein and the trailing spoon has a similar hole 26 in line with the hole 12 longitudinally considered and spaced forwardly of the rear edge portion 28 of the spoon 10. A relatively stout and substantially rigid piano wire provides wire means, generally speaking, and this is denoted by the numeral 30. It has its leading end passing through and beyond the hole 24 where it is formed with an eye 32 to accommodate the fishing line (not shown). The rear end is bent as at 34 and passes through and beyond the hole 26 where it is fashioned into an eye 36 to which the fishhook 38 is linked as at 40.

In the modified form of the invention seen in Fig. 5 which shows the upper or concave side of the body the latter is constructed to embody a leading lure 8A which is identical in construction with that seen in Figs. 1, 2 and 3. The corresponding central lure is denoted at 12A and the trailing lure at 10A. Although not detailed the leading end of the leading lure 8A is the same in construction as the one already described. The lures are riveted together as at 16A, 18A and 20A, respectively. In this arrangement the truss-like wire means comprises a single linearly straight principal or main wire or rod 30A which overlies the concave sides of the spoons in spaced relation. In this construction, however, the wire is shorter than the wire 30 and it terminates in an eye 42 which is located centrally above the lure 10A. There is an auxiliary wire member here and this is denoted at 44 and is in the form of a V-shaped yoke. The vertex or intermediate bent portion 46 is connected hingedly with the eye 42. The limb portions 48 extend through holes 50, provided therefor in the rear end portion of the trailing lure 10A. These limb portions terminate in eyes 52 which accommodate links or rings 54 to which suitable fishhooks 56 are connected. If desired, the spoon 10A may be provided with a suitably constructed and attached tail or equivalent ornament 58.

It will be understood that the wire means provides not only attaching eyes for the line and hooks, it is in effect a rigidifying truss and strengthens the over-all body or lure and provides a direct pull from the line to the hook or hooks. Therefore, there will be no danger of springing the parts of the lure out of line and affecting the intended swimming and life-like wobbling action. The wire means also renders the body independent thereof and functions as a sort of a shaft and allows the body to rock or oscillate from side to side as it is pulled through the water. Adding to this captivating and alluring action the light reflecting and flashing characteristic is also a contributing feature.

It will be clear, it is believed, that with this construction the angler does not have to use a swivel. Despite this fact, the line will not kink or twist or in any other manner foul up. In use, the lure has a straight forward swimming action imitating many marine bugs and insects on which fish feed and are likely to attack. When the lure is pulled through the water, it causes considerable disturbance in the water and this commotion induces a sound which adds to the ability of the lure to attract game fish. Actually, the lure is easily made from inexpensive materials and will meet the requirements and economies of manufacturers and the expected efficiency requirements of anglers. If retrieved at a fast pace it will operate on the surface and when trolled at a slower rate of speed it will operate comparatively deep in the water and will nevertheless maintain the desired life-like swimming action whether high or low in the water.

Inasmuch as the wire rod or shaft is spaced above the concave surfaces of the spoons which make up the body it may be employed as a means of attaching split sinkers thereon in order to render the lure heavier for more effective casting and spin-type fishing requirements.

Although it has been stated that spoon 8 is polished nickel, spoon 12 is polished brass, and spoon 10 is polished copper, it must be also stated that different color combinations and mixed colors will go into the lures; that is, some lures will be made up of all brass, some of all copper, some of all nickel, and some may be painted.

There is another feature this lure has that I have failed to mention previously, which should be of interest to a manufacturer and a boon to the angler. This added feature is that by taking several sizes of these lures and detaching the hook from the split ring and replacing with another lure (Figs. 1 to 4) and by connecting a series of the lures together, an angler can make up his own gear, commonly known as a pop gear, bell spinner, or a chain lure. These types of lures are well known for taking of large game fish when trolling. However, they can be purchased only as individual lures. Usually they range from one foot up to three or four feet long and are very bulky to carry in any fishing kit. I know of no other lure which can be hooked up in a series of this manner and still maintain their action. The shaft on which this lure operates enables this type of hook up and each lure will operate no matter how many of them are hooked together. This feature I think should be emphasized.

With further respect to the matter of operation it will be apparent that the body of the lure begins to revolve around the shaft 30 whereupon the forces of gravity will pull the body beneath the shaft. This results because the lower body has a mass greater than that of the shaft. Once the lure body is beneath the shaft it will oscillate on the shaft in the somewhat now well-known or usual manner for spoon-shaped bodies, that is, with the convex side of the lure facing downwardly.

Minor changes in shape, size and rearrangement of components may be resorted to in actual practice without departing from the spirit of the invention or the scope of the invention as claimed.

What is claimed as new is as follows:

An artificial fishing lure embodying a body comprising several spoons having adjacent portions overlapping one another and fixed together, the convex sides of said spoons facing downwardly when the lure is in use, there being a leading spoon, a trailing spoon and a central spoon interposed between said leading and trailing spoons, said spoons increasing in size from the forward end toward the rearward end of said body, whereby the leading spoon is the smallest, the central spoon slightly larger than the leading spoon and the trailing spoon is the largest, said leading spoon having a flange at its front end with a centrally located hole therein, said trailing spoon having a pair of spaced holes therein forwardly of its rear end, a linearly straight wire passing through said first-named hole, overlying the leading and central spoons and terminating at its rear end in an eye situated above the central portion of the trailing spoon, and a V-shaped wire yoke located substantially above said trailing spoon and having its vertex portion connected with said eye and its outwardly and rearwardly diverging limbs passing through the respective holes of said pair of spaced holes and terminating in eyes which are adapted to carry fishhooks.

References Cited in the file of this patent

UNITED STATES PATENTS

| | | |
|---|---|---|
| 1,273,425 | Tuttle | July 23, 1918 |
| 1,376,934 | Greene | May 3, 1921 |
| 2,123,150 | Larson et al. | July 5, 1938 |
| 2,313,572 | Nungesser | Mar. 9, 1943 |
| 2,597,035 | Rickard | May 20, 1952 |

OTHER REFERENCES

Popular Science, April 1949, page 246, upper left hand corner, "Plastic Spoons Make Lures." (Copy in Division 2 of U. S. Patent Office.)